(No Model.)
E. ROCHE.
GATE OR VALVE FOR RESERVOIRS.
No. 267,461. Patented Nov. 14, 1882.
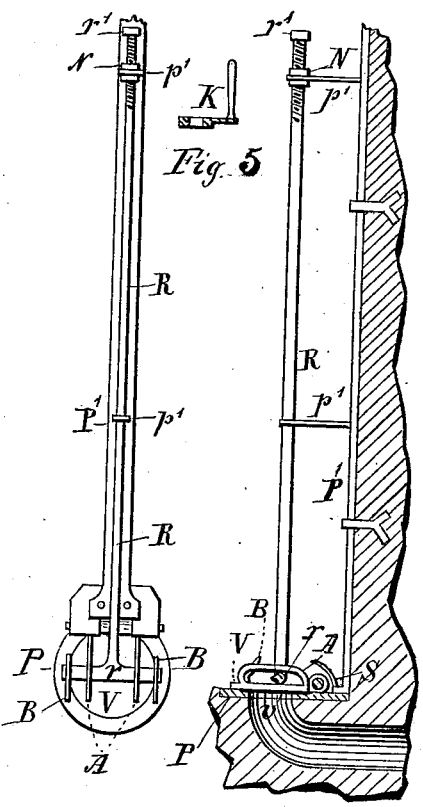
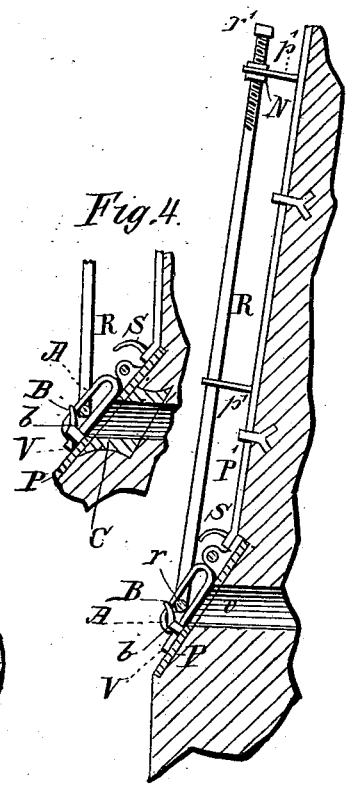
Witnesses
Wm. S. Poulter
W. Burris
Inventor
Emile Roche
per Henry Orth
att'y

UNITED STATES PATENT OFFICE.

EMILE ROCHE, OF MARSEILLES, FRANCE.

GATE OR VALVE FOR RESERVOIRS.

SPECIFICATION forming part of Letters Patent No. 267,461, dated November 14, 1882.

Application filed July 20, 1882. (No model.) Patented in France February 15, 1882, No. 147,405; in Belgium June 10, 1882; in Spain June 12, 1882; in England June 15, 1882; in Austria June 17, 1882; in Italy June 17, 1882, and in Germany June 18, 1882.

*To all whom it may concern:*

Be it known that I, EMILE ROCHE, a citizen of France, residing at Marseilles, in the Republic of France, have invented certain new and useful Improvements in Gates or Valves for Reservoirs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to simplify the construction and operation of discharge gates or valves for reservoirs, tanks, or analogous structures employed for storing and delivering water or other fluids, as hereinafter more fully described, and as shown in the accompanying drawings, in which—

Figure 1 is a front view of my improved gate or valve; Fig. 2, a side sectional view thereof, showing its application within a reservoir or basin. Fig. 3 is a like view showing its application to the outside of a reservoir or basin. Fig. 4 is a sectional view of the gate or valve provided with a casing to be embedded into the masonry, and Fig. 6 is a detail view of the key employed to operate the gate or valve.

Like letters of reference indicate like parts wherever such may occur in the above figures of drawings.

The gate or valve is composed of a seat-plate, P, that carries upon opposite sides on its upper face a locking bar, B, provided with a wedge-shaped recess, $b$, a disk-valve, V, provided upon its seat-face with a rubber gasket or packing, $v$, and on its upper face with slotted guide-bars A, an operating-rod, R, that has a cross-head, $r$, wedge-shaped in cross-section, that is fitted and slides in the slots of the guide-bars A and operates to engage the recesses of the locking-bars B to lock the valve securely to its seat. When the valve is located on a horizontal plane, as shown in Fig. 2, with its operating-lever at right angles thereto, the cross-head $r$ will hold the valve in a closed position without engaging the locking-bars B, as will be readily understood.

The gate or valve-seat plate P may be secured in position in any desired manner—as, for instance, by means of a supporting plate or bar, P', attached to or formed on plate P, as shown. The supporting-plate P' carries standards $p'$, that form supports and guides for the operating-rod R, the latter being provided with a square head, $r'$, upon which may be fitted a key, K, (shown in Fig. 6,) for rotating said rod. One of the standards $p'$ carries a nut, N, through which the rod R passes, said rod being screw-threaded at that point to fit the correspondingly-threaded nut, the arrangement of the rod and its supporting-plate being such that when said rod is rotated in one or the other direction it will move at right angles to (or practically so) and toward or from the disk-valve V, as shown. It will be seen that when the rod R is rotated in one direction to cause it to recede from the disk-valve V, its cross-head will slide in the slots of the guide-bars A A and draw the valve away from its seat, a stop, S, Fig. 4, being preferably provided to limit the movement of said gate from its seat. When the rod R is rotated in a reverse direction to cause it to approach the disk-valve, the cross-head $r$ of said rod will force the valve to its seat and will enter the wedge-shaped recesses of the locking bars B and wedge or lock said valve firmly to its seat. In this manner I provide a perfectly-tight joint between the valve and seat and securely lock the former to the latter against displacement from any cause, and at the same time furnish simple and effective means to regulate the volume of liquid passing through the gate.

When the gate is used in reservoirs or basins, I prefer to construct its seat-plate P with a tubular casing, C, having a concave periphery, that adapts it to be readily embedded and anchored in the masonry of the structure, as shown in Fig. 5.

The construction of the improved gate is such as to make it available for general purposes where a clack or flap valve can be employed, as it may be made of any desired size from that required for the largest reservoirs, basins, or analogous structures to the smallest valve size. It provides a ready means whereby the volume of water passing through said gate or valve may be regulated, and it can be manipulated or operated with great facility.

Having now described my invention, what I claim, is—

1. In a gate or valve, the combination of a seat-plate, a valve-disk hinged thereto, provided with slotted guide-bars with an operating-lever carrying a cross-head arranged to slide within the slots of said guide-bars to actuate the valve, substantially as and for the purposes specified.

2. In a gate or valve of the class described, the combination of a seat-plate provided with locking bars having wedge-shaped recesses, a disk-valve hinged upon said seat-plate and carrying slotted guide-bars, with an operating-rod provided with a cross-head that is wedge-shaped in cross-section, and arranged to slide in the slots of the guide-bars and engage the wedge-shaped recesses of the locking-bars, all combined and operating substantially as and for the purposes specified.

3. In a gate or valve of the class described, a valve-seat provided with a tubular casing or extension, having a concave outer periphery, whereby said seat may be embedded and anchored in the walls of the structure to which the gate is applied, substantially as and for the purposes specified.

4. The gate or valve described, composed of a seat-plate, P, carrying the locking bars B, a disk-valve hinged to said plate and carrying the slotted guide-bars A, and operating-rod R, provided with a cross-head, r, that is wedge-shaped in cross-section, and a stop, S, to limit the movement of the disk-valve from its seat, substantially as and for the purposes specified.

5. The combination, with the gate or valve, its seat-plate and its operating-rod, constructed as described, of the supporting-plate P', provided with its standards p' and the nut N, substantially as and for the purposes specified.

In testimony that I claim the foregoing I have hereunto set my hand this 30th day of May, 1882.

EMILE ROCHE.

Witnesses:
PHILIPPE GAZEL,
JOS. FORESTIER.